United States Patent [19]
Gitlin et al.

[11] Patent Number: 5,278,681
[45] Date of Patent: Jan. 11, 1994

[54] COMBINED COLOR AND MONOCHROME DISPLAY

[75] Inventors: Richard D. Gitlin, Little Silver; Richard V. Kollarits, Colts Neck; John F. Ribera, Howell; Clark Woodworth, Rumson, all of N.J.

[73] Assignee: AT&T Bell Laboratories, Murray Hill, N.J.

[21] Appl. No.: 59,867

[22] Filed: May 10, 1993

Related U.S. Application Data

[63] Continuation of Ser. No. 939,757, Sep. 2, 1992, abandoned.

[51] Int. Cl.$^5$ .................. G02F 1/133; H04N 9/76
[52] U.S. Cl. ............................ 359/48; 359/69; 358/23
[58] Field of Search ............ 359/45, 48, 49, 69; 358/31, 85, 23, 25, 17, 92

[56] References Cited

U.S. PATENT DOCUMENTS

| | | | |
|---|---|---|---|
| 4,090,219 | 5/1978 | Ernstoff et al. | 358/59 |
| 4,400,725 | 8/1983 | Tanigaki | 358/85 |
| 4,611,889 | 9/1986 | Buzak | 359/48 |
| 4,928,301 | 5/1990 | Smoot | 379/85 |
| 5,117,285 | 5/1992 | Nelson et al. | 358/85 |
| 5,159,445 | 10/1992 | Gitlin et al. | 358/85 |

FOREIGN PATENT DOCUMENTS

| | | |
|---|---|---|
| 454245 | 10/1991 | European Pat. Off. |
| 62-258574 | 11/1987 | Japan |
| 63-102483 | 5/1988 | Japan |
| 63-311890 | 12/1988 | Japan |
| 4-150683 | 5/1992 | Japan |

Primary Examiner—William L. Sikes
Assistant Examiner—Huy Mai
Attorney, Agent, or Firm—Gerard A. deBlasi

[57] ABSTRACT

The advantages of both a color display and a high-resolution monochrome display are realized in a single display system by eliminating color filters from the display screen of the display system and illuminating the display screen with either colored light or white light to provide color or high-resolution monochrome capability, respectively. Simultaneous color and high-resolution monochrome capability is realized by illuminating predetermined portions of the display screen with only colored light while illuminating different portions of the display screen with only white light.

15 Claims, 2 Drawing Sheets

COMBINED COLOR AND MONOCHROME DISPLAY

This application is a continuation of application Ser. No. 07/939757, filed on Sep. 2, 1992, now abandoned.

TECHNICAL FIELD

This invention relates to displays and, more particularly, to displays that provide the dual capability of both a color display and a high-resolution monochrome display.

BACKGROUND OF THE INVENTION

Conventional liquid crystal display systems are available as either color or monochrome displays. Each type of display provides certain advantages that are not available in the other type of display. For example, color displays provide wide versatility, finding applications in graphics displays and various user-friendly software applications. Moreover, color capability often is demanded by consumers. On the other hand, monochrome liquid crystal displays provide higher resolution than their color counterparts. Unlike conventional color displays, which require three picture elements ("pixels") of the display screen to display a single color data point (i.e., one pixel for each of the red, green, and blue components of the color data point), only one pixel is required to display each monochrome data point. Thus, a monochrome display can provide three times as many pixels as a similar color display.

Conventional color liquid crystal displays are manufactured by forming a color filter layer integrally with the liquid crystal displays screen. Thus, a display that is manufactured as a color display cannot double as a monochrome display to provide enhanced resolution. Similarly, a monochrome display cannot provide color capabilities. Using conventional designs, a single display cannot provide the advantages of both a color display and a monochrome display.

Accordingly, it would be desirable to provide a single display that could provide the advantages of both a color display and a high-resolution monochrome display.

SUMMARY OF THE INVENTION

The advantages of both a color display and a high-resolution monochrome display are achieved in a single display system in accordance with the principles of the present invention by eliminating color filters from the display screen of the display system and illuminating the display screen with either colored light or white light to provide color or high-resolution monochrome capability, respectively.

In an exemplary embodiment of the invention, color capability is realized by providing a color dot projector configured to project an array of red, green, and blue color dots onto a diffuse surface of a display screen that lacks color filters. Each color dot is projected onto a different, separately-addressable cell of a liquid crystal array. The color dot projector is switched out of operation and replaced by a white light source to provide high-resolution monochrome capability. Simultaneous color and high-resolution monochrome capability is realized by illuminating predetermined portions of the display screen with only colored light while illuminating different portions of the display screen with only white light.

DETAILED DESCRIPTION

Figure 1:
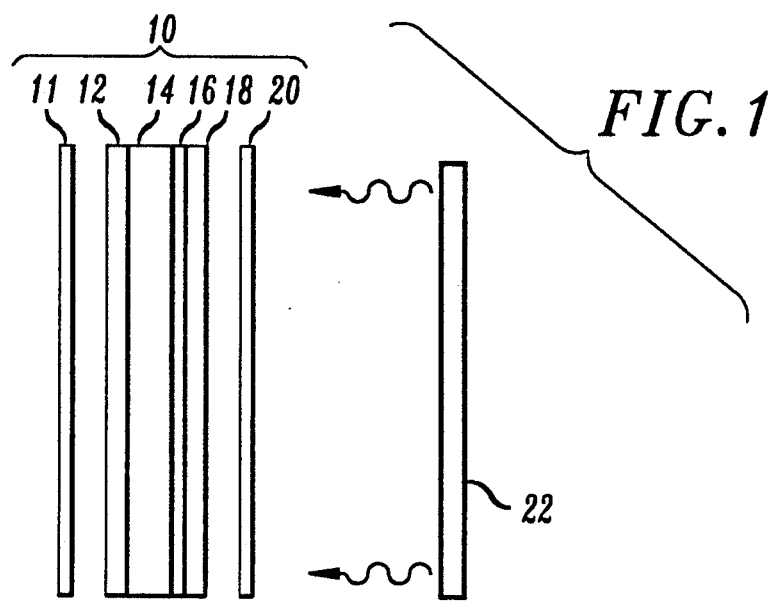
FIG. 1 is a simplified block diagram of a conventional liquid crystal display screen, together with white light and colored light sources.

FIG. 1 shows a conventional liquid crystal color display 10. Color display 10 includes a front polarizer 11, a front glass layer 12, a liquid crystal array 14, color filters 16, rear glass layer 18, and rear polarizer 20, all of which are integrated as a single unit. Liquid crystal array 14 includes several conventional elements which are not explicitly shown, such as a conducting layer, alignment layers on each side of liquid crystal array 14, and a circuit layer. Images are displayed on display 10 by illuminating the display with white light that passes through rear polarizer 20 from a backlight 22.

Liquid crystal array 14 comprises a predetermined number of independently-controllable cells. Light from backlight 22 is polarized by rear polarizer 20 and enters each liquid crystal cell of liquid crystal array 14. Each cell operates to rotate the polarization direction of light passing through the cell. The amount of polarization rotation caused by each cell is determined by an electrical control signal applied the respective liquid crystal cell. After passing through the cell, the light passes through front polarizer 11 and to the person viewing the display. The intensity of the light exiting each liquid crystal cell depends upon the degree of rotation, caused by the cell, of the polarization of the light relative to the polarization axis of front polarizer 11.

Three cells are grouped together to form a color pixel of display 10. Each of the three cells (also referred to hereafter as "subpixels") is associated with a respective one of red, green, and blue color filters. To produce color at a given pixel, light is allowed to pass through the three subpixels in the ratio required to produce the color desired at that pixel.

Figure 2:
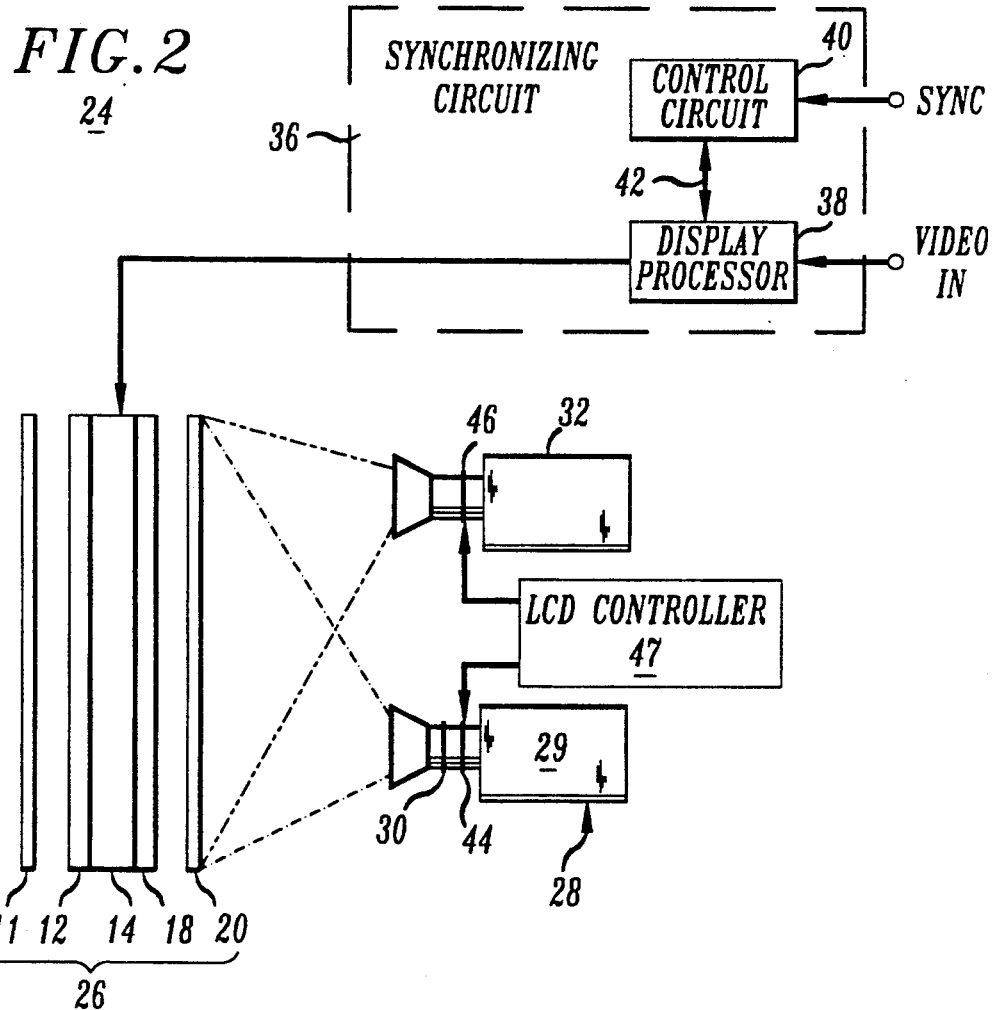
FIG. 2 is a simplified block diagram of an exemplary display system constructed in accordance with the principles of the present invention.

FIG. 2 shows an exemplary embodiment of a color display system 24 constructed in accordance with the principles of the present invention. The display system comprises a monochrome display screen 26, a color dot projector 28 (which includes a white light dot projector 29 and color filters 30), and a white light source 32. Display screen 26 includes a diffusing means 34, front polarizer 11, liquid crystal array 14, glass layers 12 and 18, and a rear polarizer 20.

Display system 24 provides the dual capability of both a color display and a high-resolution monochrome display through the use of a plurality of independently-controllable light sources. More specifically, display system 24 provides this dual capability by positioning the color filters adjacent one of two independently-controllable light sources, rather than forming the color filters integrally with the display screen, as in conventional liquid crystal color display systems.

In instances in which high resolution, rather than color, is at a premium (such as for text), color dot projector 28 is switched out of operation using conventional switching circuitry and replaced with white light source 32, to provide a high-resolution monochrome display. Using this technique, the effective number of pixels in the display can be increased by a factor of three, because only one liquid crystal cell (i.e., subpixel) is required per pixel for a monochrome display.

color dot projector 28 projects a two-dimensional array of red, green, and blue dots of light through the back surface of liquid crystal array 14 and onto diffusing means 34. During manufacture of the display system, a red, green, and blue dot are permanently focused on a different one of the three subpixels that form each pixel of display screen 26. During display operation, front and rear polarizers 11 and 20 act in combination with liquid crystal array 14 to attenuate, and thus modulate, the intensity of the colored light dots. Diffusing means 34 diffuses the colored light dots to form an image on display screen 26.

Although the invention is described in the context of a twisted neumatic liquid crystal display, it will be apparent to one skilled in the art that the principles of the invention are readily adaptable to other types of displays. For example, the invention can be adapted for use with flat screen displays, such as ferro-electric liquid crystal displays.

A synchronizing circuit 36 comprising a display processor 38 and a control circuit 40 is constructed from conventional circuits and controls the operation of liquid crystal array 14. Coordination between display processor 38 and control circuit 40 is established by signals on lead 42. Synchronizing circuit 36 receives via a lead labeled VIDEO IN video images or data that are to be displayed on display screen 26. Display processor 38 converts the input video images or data into a form compatible with display screen 26. Because display processor 38 controls the operation of display screen 26, it is convenient to have it also control the operation of color dot projector 28 and white light source 32.

Display system 24 can be configured to provide simultaneous color display and high-resolution monochrome display, each on a different section of display screen 26. Additional liquid crystal arrays, namely, arrays 44 and 46 and any polarizers (not shown) that may be required, operating under the control of a liquid crystal display controller 47, implement the selective and simultaneous display of color and monochrome video data on display screen 26.

More particularly, liquid crystal array 44 is imaged on display screen 26 by color dot projector 28, to selectively block light output from color dot projector 28. Similarly, liquid crystal array 46 is imaged on display screen 26 by white light source 32, to selectively block light output from white light source 32. Selective blocking of light enables one portion of display screen 26 to be illuminated only color dot projector 28 while a different portion of display screen 26 is illuminated by only white light source 32. This permits simultaneously displaying information on different segments of the display screen using both color dot projector 28 and white light source 32. The cells of liquid crystal array 14 are controlled by display processor 38 with color or monochrome data according to their location in the array. That is, a given cell will display monochrome information if that cell is in a portion of the display screen illuminated by white light, and will display color information if the cell is in a portion of the display screen illuminated by colored light.

Liquid crystal arrays 44 and 46 typically are low resolution arrays, such as 4×4 directly-addressed, non-multiplexed arrays, although the arrays may be of any other suitable resolution such as 2×2 or 16×16. Liquid crystal arrays 44 and 46 are controlled independently. For example, the addressable elements of liquid crystal array 44 can be controlled to block light, output from color dot projector 28, that is incident on the top half of array 44 from passing through array 44 while allowing light incident on the bottom half of array 44 to pass through the array. At the same time, the addressable elements of liquid crystal array 46 can be controlled to block light from white light source 32 incident on the bottom half of array 46 while passing light incident on the top half of array 46. In this example, the bottom half of display screen 26 will display color information, because only light from color dot projector 28 has been allowed to pass to the bottom half of display screen 26. Similarly, the top half of display screen 26 will display monochrome information, because only light from white light source 32 has been allowed to pass to the top half of display screen 26. One skilled in the art will appreciate that color and monochrome video data can be displayed selectively at any location on the screen through appropriate control of liquid crystal arrays 14, 44, and 46.

Figure 3:
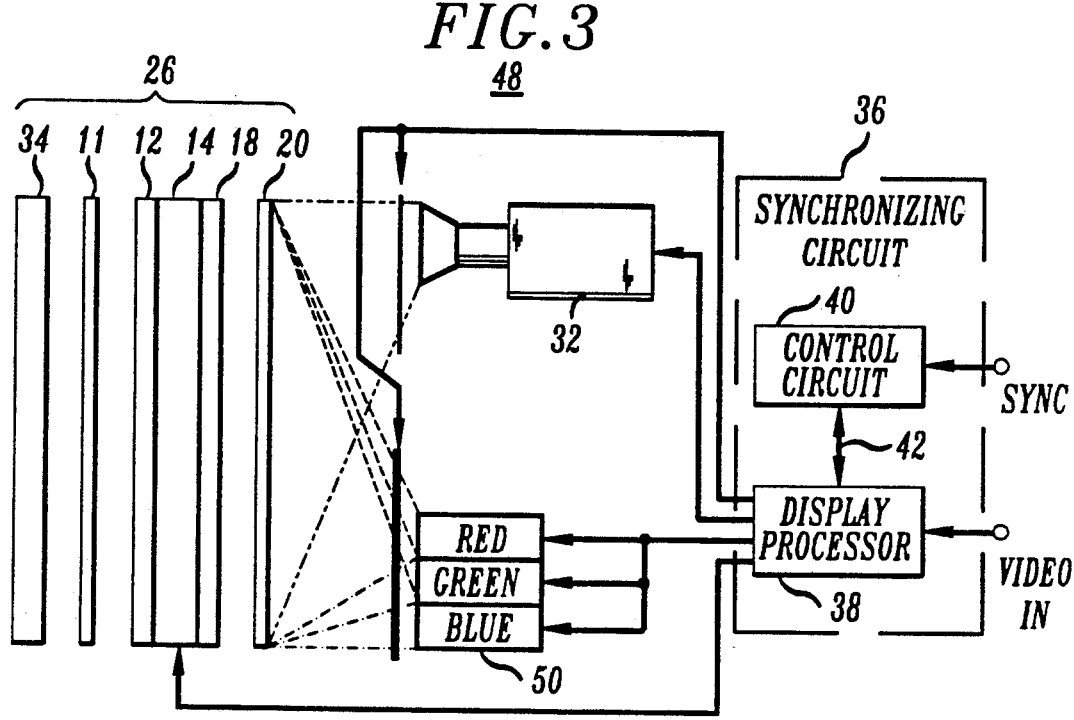
FIG. 3 is a simplified block diagram of an alternative embodiment of the display system of FIG. 2.

FIG. 3 shows an alternative embodiment of a display system constructed in accordance with the particles of the present invention. The display system 48 includes display screen 26, switched light sources 50, white light source 32, control circuit 36, and liquid crystal arrays 44 and 46. As in the display system of FIG. 2, display screen 26 is free of color filters. As described below, color capability is provided in the display by illuminating display screen 26 with colored light from switched light sources 50. High-resolution monochrome capability is provided by white light source 32.

Switched light sources 50 illustratively comprise a bank of three controllable light sources, namely, a red, a green, and a blue light source. As described below and illustrated in FIG. 4, each of the switched light sources 50 illuminates the entire area of display screen 26 (i.e., all pixels and subpixels) with a single color in a time-sequential manner. Because each of switched light sources 50 illuminates all pixels of the display screen at once (with each color, sequentially in time), it is unnecessary to pre-focus dots of light on each subpixel as required in the embodiment of FIG. 2. Display screen 26, white light source 32, control circuit 36, and liquid crystal arrays 44 and 46 operate as previously described. However, the white light required to produce high-resolution monochrome capability could be provided by illuminating pixels with simultaneously light from the red, green, and blue light sources of switched light sources 50, rather than providing a dedicated white light source.

Liquid crystal arrays 14, 44, and 46 are controlled to selectively and simultaneously display color and high-resolution monochrome information on display screen 26. Liquid crystal array 44 is imaged on display screen 26 by switched light sources 50, to selectively block light output from switched light sources 50 from reaching the display screen. Similarly, liquid crystal array 46 is imaged on display screen 26 by white light source 32, to selectively block light output from white light source 32. This permits simultaneously displaying information on different segments of the display screen using both dot projector 28 and white light source 32. The cells of liquid crystal array 14 are controlled with either color or monochrome data, depending upon whether a given cell is illuminated by colored or white light. The operation of liquid crystal arrays 44 and 46 do not affect the operation and timing of switched light sources 50 that are described below.

Figure 4:
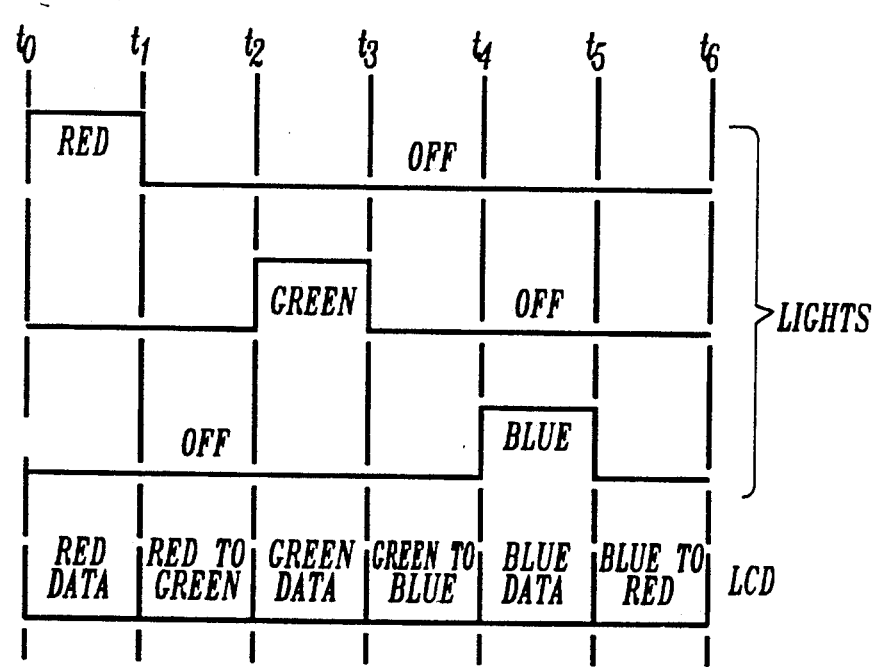
FIG. 4 shows an exemplary timing diagram for the video display system of FIG. 3.

FIG. 4 illustrates the timing of the operation of liquid crystal array 14 and switched light sources 50. Liquid crystal array 14 is illuminated with red, green, and blue light in a time-multiplexed fashion during time intervals t0–t1, t2–t3, and t4–t5, respectively. The display pixels of liquid crystal array 14 are controlled during time intervals t0–t1, t2–t3, and t4–t5 to pass the correct intensity of the illuminating color for the information to be displayed. For example, during time interval t0–t1, liquid crystal array 14 is controlled with the data for passing or blocking red light. Similarly, during time intervals t2–t3 and t4–t5, liquid crystal array 14 is controlled to pass or block green and blue light, respectively. The eye of a viewer then integrates the red, green, and blue images into a single color image. Time intervals t1–t2, t3–t4, and t5–t6 are provided to permit liquid crystal array 14 to be switched to display new data and to allow the light from switched light sources 50 to sufficiently decay. Data presentation in each of the three colors must be performed at a sufficient rate to prevent flicker.

The display system of FIG. 3 requires only one liquid crystal cell (i.e., subpixel) per color pixel. This is in contrast to three subpixels per color pixel required in prior art color displays. Thus, smaller, less complicated, and more transmissive displays are possible. Also, the number of pixels in the display can be increased by a factor of three. The display has the additional characteristic that all colors for a given color pixel come from exactly the same physical point on the display screen. Thus, the arrangement of FIG. 3 is useful for improving displays of both computers and televisions.

It will be understood that the foregoing is merely illustrative of the principles of the invention, and that various modifications can be made by those skilled in the art without departing from the scope and spirit of the invention.

We claim:

1. A display system configured to selectively display data to a viewer as at least one of color data at a first resolution and monochrome data at a second, higher resolution, the system comprising:
    diffusing means having a surface for diffusing light impinging thereon;
    means for illuminating the diffusing surface of the diffusing means with light comprising a plurality of discrete colors;
    a white light source for illuminating the diffusing surface of the diffusing means with white light; and
    means interposed between the diffusing means and the illuminating means for modulating the intensity of the light from the illuminating means and the white light source before the light impinges on the diffuse surface, so as to display on the diffusing means color data at the first resolution and monochrome data at the second resolution.

2. The apparatus as defined in claim 1 wherein the illuminating means comprises controllably switched light sources for illuminating the diffusing surface of the diffusing means with a plurality of discrete colors in a time-multiplexed sequence.

3. The apparatus as defined in claim 1 wherein the modulating means comprises a plurality of monochrome liquid crystal cells arranged in an array of n rows and m columns, each cell of the array selectively rotating the polarization of light passing therethrough to vary the intensity of the light.

4. The apparatus as defined in claim 3 wherein the illuminating means comprises a dot projector means for projecting an array of red, blue, and green color dots onto the diffusing surface of the diffusing means, each color dot passing through a different predetermined one of the monochrome liquid crystal cells.

5. The apparatus as defined in claim 1 further comprising means for selectively energizing one of the white light source and the illuminating means.

6. The apparatus as defined in claim 1 further comprising means for selectively blocking light output from the white light source and the illuminating means such that a first portion of the diffusing means is illuminated only by light from the white light projector means and a mutually exclusive second portion of the diffusing means is illuminated only by light from the illuminating means.

7. The apparatus as defined in claim 6 wherein the blocking means comprises:
    a first array comprising a plurality of liquid crystal cells, the first array being imaged on the means for modulating by the white light source; and
    a second array comprising a plurality of liquid crystal cells, the second array being imaged on the means for modulating by the illuminating means.

8. A method for displaying first predetermined data to a viewer as color data at a first resolution and simultaneously displaying second predetermined data as monochrome data at a second, higher resolution, the method comprising the steps of:
    illuminating a first portion of a diffuse surface of a diffusing means with light comprising a plurality of discrete colors;
    illuminating a second portion of the diffuse surface with white light; and
    modulating the intensity of the white light and the light comprising a plurality of discrete colors with a modulating means before the white light and the light comprising a plurality of discrete colors impinges on the diffuse surface, so as to display on the diffusing means color data at the first resolution and monochrome data at the second resolution.

9. The method as defined in claim 8 wherein the step of illuminating the first portion comprises transmitting the plurality of discrete colors in a time-multiplexed sequence.

10. The method as defined in claim 8 wherein the modulating means comprises a plurality of monochrome liquid crystal cells arranged in an array of n rows and m columns, each cell of the array selectively rotating the polarization of light passing therethrough to vary the intensity of the light.

11. The method as defined in claim 10 wherein the step of illuminating the second portion comprises outputting an array of red, blue, and green color dots onto the second portion of the diffusing means, each color dot passing through a different one of the monochrome liquid crystal cells.

12. A display system configured to selectively display data to a viewer as at least one of color data at a first resolution and monochrome data at a second, higher resolution, the system comprising:
    diffusing means having a surface for diffusing light impinging thereon;

means for illuminating the diffusing surface of the diffusing means with light comprising a plurality of discrete colors;

a white light source for illuminating the diffusing surface of the diffusing means with white light;

means interposed between the diffusing means and the illuminating means for modulating the intensity of the light from the illuminating means and the white light source before the light impinges on the diffuse surface, so as to display on the diffusing means color data at the first resolution and monochrome data at the second resolution, the modulating means comprising a plurality of monochrome liquid crystal cells arranged in an array of n rows and m columns, each cell of the array selectively rotating the polarization of light passing therethrough to vary the intensity of the light; and means for selectively blocking light output from the white light source and the illuminating means such that a first portion of the diffusing means is illuminated only by light from the white light source and a mutually exclusive second portion of the diffusing means is illuminated only by light from the illuminating means.

13. The apparatus as defined in claim 12 wherein the illuminating means comprises a dot projector means for projecting an array of red, blue, and green color dots onto the diffusing surface of the diffusing means, each color dot passing through a different predetermined one of the monochrome liquid crystal cells.

14. The apparatus as defined in claim 12 wherein the illuminating means comprises controllably switched light sources for illuminating the diffusing surface of the diffusing means with a plurality of discrete colors in a time-multiplexed sequence.

15. The apparatus as defined in claim 12 wherein the blocking means comprises:

a second array comprising a plurality of liquid crystal cells, the second array being imaged on the monochrome liquid crystal array by the white light source; and a third array comprising a plurality of liquid crystal cells, the third array being imaged on the monochrome liquid crystal array by the illuminating means.

* * * * *